United States Patent
Kuo et al.

(10) Patent No.: US 8,692,955 B2
(45) Date of Patent: Apr. 8, 2014

(54) BACKLIGHT MODULE AND LIQUID CRYSTAL DISPLAY

(75) Inventors: Yicheng Kuo, Shenzhen (CN); Yanxue Zhang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 233 days.

(21) Appl. No.: 13/264,840

(22) PCT Filed: Sep. 7, 2011

(86) PCT No.: PCT/CN2011/079443
§ 371 (c)(1),
(2), (4) Date: Oct. 17, 2011

(87) PCT Pub. No.: WO2013/026218
PCT Pub. Date: Feb. 28, 2013

(65) Prior Publication Data
US 2013/0044279 A1    Feb. 21, 2013

(30) Foreign Application Priority Data
Aug. 19, 2011   (CN) .............................. 2011 2 034502

(51) Int. Cl.
*G02F 1/1333*    (2006.01)

(52) U.S. Cl.
USPC ............................................. 349/58

(58) Field of Classification Search
USPC ......................................... 349/58, 65
See application file for complete search history.

(56) References Cited

U.S. PATENT DOCUMENTS

| | | | |
|---|---|---|---|
| 7,374,316 B2 * | 5/2008 | Kuo et al. | 362/373 |
| 7,600,908 B2 * | 10/2009 | Chang et al. | 362/623 |
| 7,742,121 B2 * | 6/2010 | Mori et al. | 349/58 |
| 8,253,886 B2 * | 8/2012 | Jeong et al. | 349/65 |
| 8,259,281 B2 * | 9/2012 | Takahashi | 349/161 |

* cited by examiner

*Primary Examiner* — James Dudek
(74) *Attorney, Agent, or Firm* — Ditthavong Mori & Steiner, P.C.

(57) ABSTRACT

The present invention discloses a backlight module which comprises a back-plate, the back-plate is in a L-shape and includes a first back-plate and a second back-plate; the backlight module further comprises a first radiator and a first light source used to emit red light, the first radiator is connected to the first light source; the first back-plate has a through hole, the first radiator is disposed on the outer side of the first back-plate, the first light source is inserted in the through hole and is extended to the inner side of the first back-plate. The present invention also discloses a liquid crystal display.

10 Claims, 3 Drawing Sheets

BACKLIGHT MODULE AND LIQUID CRYSTAL DISPLAY

BACKGROUND OF THE INVENTION

1. Field of Invention

The present invention relates to the field of liquid crystal display technology and more particularly to a backlight module and a liquid crystal display.

2. Related Art

In the wake of the continuous development of liquid crystal display technology, users are getting more demanding on liquid crystal display functions.

Take a backlight module of a liquid crystal display as an example; a white light source of a light emitting bar of an existing backlight module is usually formed by mixing a blue light source with yellow fluorescent powder. The degree of red saturation of the white light emitted from the white light source produced with this method is not ideal. Thus, the red pictures are easily distorted when they are displayed on a screen.

In order to solve the abovementioned problem, a common method is to add a red light source in the backlight module to enhance the picture saturation. But, the problem is that the wavelength of red light is substantially more sensitive to temperature than the wavelength of blue light which forms the white light source. When the temperature of the backlight module increases, the extent of reduction of brightness of the red light source is more significant than that of the white light source. Referring to FIG. 1, L1 is a variation curve of the brightness of blue light in reaction to temperature, while L2 a variation curve of the brightness of red light in reaction to temperature. Obviously, the slope of L2 is larger than that of L1.

Furthermore, the radiator connected to the red light source and the radiator connected to the white light source are both disposed on the same side of the backlight module; therefore, heat cannot be dissipated timely and causes the temperature to increase because of poor heat dissipation effect. Thus, the brightness of the red light source is affected.

In conclusion, in the liquid crystal display technology, because the display quality is affected by the reduced brightness of the red light source caused by increased temperature; it is a technical issue on how to solve the problem of the radiators of the red light source and the white light source being disposed too closely to each other, and how to improve the poor heat dissipation effect.

SUMMARY OF THE INVENTION

An object of the present invention is to provide a backlight module to tackle the existing technical problems of the radiators of the red light source and the white light source being disposed too closely to each other and poor heat dissipation effect, which cause the temperature to increase and results in the reduced brightness of the red light source to affect the display quality.

In order to tackle the abovementioned problems, the present invention provides a backlight module which comprises a back-plate, the back-plate is in a L-shape and includes a first back-plate and a second back-plate;

the backlight module further comprises a first radiator and a first light source used to emit red light, the first radiator is connected to the first light source; the first back-plate has a through hole, the first radiator is disposed on the outer side of the first back-plate, the first light source is inserted in the through hole and is extended to the inner side of the first back-plate;

the first radiator includes a heat conduction plate and a plurality of heat dissipation fins, the heat dissipation fins are connected to the heat conduction plate;

the backlight module further comprises a second radiator and a second light source used to emit white light, the second light source is disposed on the second back-plate and is on the inner side of the second back-plate, the second radiator is disposed between the second light source and the second back-plate.

In the backlight module of the present invention, the heat conduction plate has a first groove, and the first groove and the first light source are fitted and engaged with each other.

In the backlight module of the present invention, the first back-plate is structurally bent, and includes a first back-plate portion, a second back-plate portion and a third back-plate portion; wherein the first back-plate portion and the third back-plate portion are extended horizontally and parallel to each other; and the second back-plate portion is perpendicular to the horizontal and is connected to the first back-plate portion and the third back-plate portion, respectively.

In the backlight module of the present invention, a second groove is formed at a connection portion between the bent first back-plate and the second back-plate, and the through hole is disposed in the second groove.

In the backlight module of the present invention, the backlight module further comprises a light guide plate, the light guide plate is parallel to the horizontal, the first back-plate is disposed under the light guide plate, the second back-plate is disposed beside the light guide plate, the light guide plate is connected to the third back-plate portion and covers the opening of the second groove, and the light guide plate is further connected to the second light source.

Another object of the present invention is to provide a backlight module to tackle the existing technical problems of the radiators of the red light source and the white light source being disposed too closely to each other and poor heat dissipation effect, which cause the temperature to increase and results in the reduced brightness of the red light source to affect the display quality.

In order to tackle the abovementioned problems, the present invention provides a backlight module which comprises a back-plate, the back-plate is in a L-shape and includes a first back-plate and a second back-plate;

the backlight module further comprises a first radiator and a first light source used to emit red light, the first radiator is connected to the first light source; and the first back-plate has a through hole, the first radiator is disposed on the outer side of the first back-plate, the first light source is inserted in the through hole and is extended to the inner side of the first back-plate.

In the backlight module of the present invention, the backlight module further comprises a second radiator and a second light source used to emit white light, wherein the second light source is disposed on the second back-plate and is on the inner side of the second back-plate, and the second radiator is disposed between the second light source and the second back-plate.

In the backlight module of the present invention, the first radiator includes a heat conduction plate and a plurality of heat dissipation fins, and the heat dissipation fins are connected to the heat conduction plate.

In the backlight module of the present invention, the heat conduction plate has a first groove, and the first groove and the first light source are fitted and engaged with each other.

In the backlight module of the present invention, the first back-plate is structurally bent, and includes a first back-plate portion, a second back-plate portion and a third back-plate portion; wherein the first back-plate portion and the third back-plate portion are extended horizontally and parallel to each other; and the second back-plate portion is perpendicular to the horizontal and is connected to the first back-plate portion and the third back-plate portion, respectively.

In the backlight module of the present invention, a second groove is formed at a connection portion between the bent first back-plate and the second back-plate, and the through hole is disposed in the second groove.

In the backlight module of the present invention, the backlight module further comprises a light guide plate, the light guide plate is parallel to the horizontal, the first back-plate is disposed under the light guide plate, the second back-plate is disposed beside the light guide plate, the light guide plate is connected to the third back-plate portion and covers the opening of the second groove, and the light guide plate is further connected to the second light source.

Yet another object of the present invention is to provide a liquid crystal display to tackle the existing technical problems of the radiators of the red light source and the white light source being disposed too closely to each other and poor heat dissipation effect, which cause the temperature to increase and results in the reduced brightness of the red light source to affect the display quality.

In order to tackle the abovementioned problems, the present invention provides a liquid crystal display which comprises: a light guide plate, the light guide plate is parallel to the horizontal; and a backlight module, the backlight module comprises a back-plate, the back-plate is in a L-shape and it includes a first back-plate and a second back-plate, the first back-plate is disposed under the light guide plate, and the second back-plate is disposed beside the light guide plate;

the backlight module further comprises a first radiator and a first light source used to emit red light, the first radiator is connected to the first light source; and the first back-plate has a through hole, the first radiator is disposed on the outer side of the first back-plate, the first light source is inserted in the through hole and is extended to the inner side of the first back-plate.

In the liquid crystal display of the present invention, the backlight module further comprises a second radiator and a second light source used to emit white light, the second light source is disposed on the second back-plate and is on the inner side of the second back-plate, and the second radiator is disposed between the second light source and the second back-plate.

In the liquid crystal display of the present invention, the first radiator includes a heat conduction plate and a plurality of heat dissipation fins, and the heat dissipation fins are connected to the heat conduction plate.

In the liquid crystal display of the present invention, the heat conduction plate has a first groove, and the first groove and the first light source are fitted and engaged with each other.

In the liquid crystal display of the present invention, the first back-plate is structurally bent, and includes a first back-plate portion, a second back-plate portion and a third back-plate portion; wherein the first back-plate portion and the third back-plate portion are extended horizontally and are parallel to each other; and the second back-plate portion is perpendicular to the horizontal and is connected to the first back-plate portion and the third back-plate portion, respectively.

In the liquid crystal display of the present invention, a second groove is formed at the connection between the bent first back-plate and the second back-plate, and the through hole is disposed in the second groove.

In the liquid crystal display of the present invention, the light guide plate is connected to the third back-plate portion and covers the opening of the second groove, and the light guide plate is further connected to the second light source.

In comparing to existing technology, the present invention can enhance the display quality of pictures by tackling the existing technical problems of the radiators of the red light source and the white light source being disposed too closely to each other and poor heat dissipation effect, which cause the temperature to increase and results in the reduced brightness of the red light source.

The structure and the technical means adopted by the present invention to achieve the above and other objects can be best understood by referring to the following detailed description of the preferred embodiments and the accompanying drawings.

DETAILED DESCRIPTION OF THE INVENTION

The following description of the preferred embodiments is referring to the accompanying drawings to exemplify specific practicable embodiments of the present invention.

Figure 1:
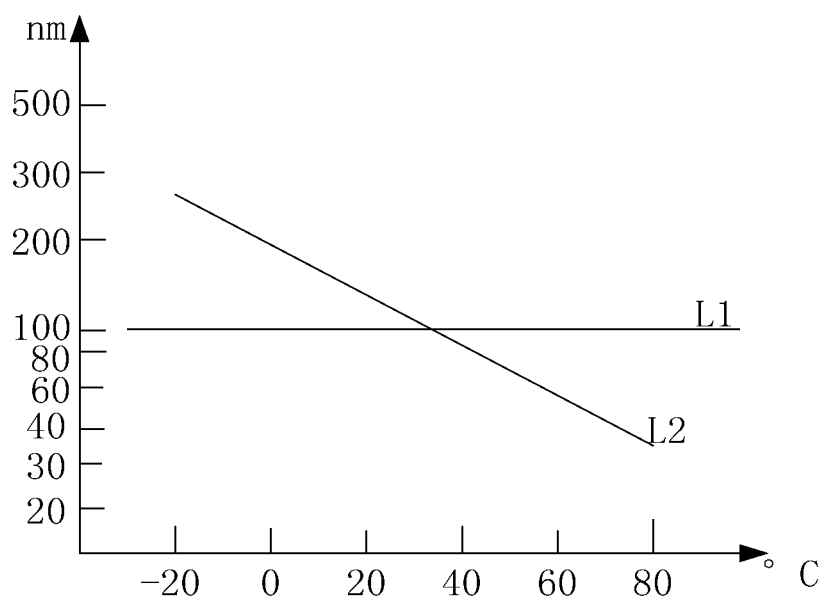
FIG. 1 is an illustration of curves of the brightness of red light and blue light in existing technique in reaction to change of temperature.
Figure 2:
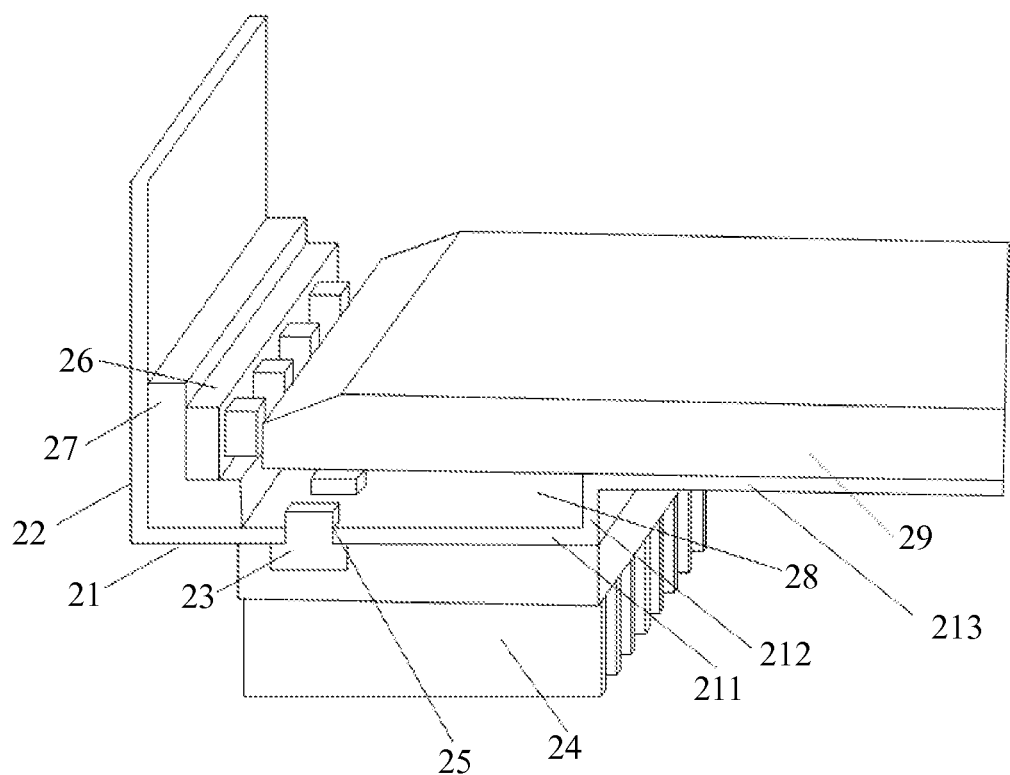
FIG. 2 is a structural illustration of a preferred embodiment of a backlight module of the present invention.

Referring to FIG. 2, it shows a structure of a preferred embodiment of a backlight module of the present invention. The backlight module comprises a back-plate (unlabeled), the back-plate is in an L-shape and it comprises a first back-plate 21 and a second back-plate 22. In this embodiment, the first back-plate 21 is the horizontal bottom plate of the L-shaped back-plate, while the second back-plate 22 is the vertical side plate of the L-shaped back-plate. One or a plurality of the second back-plates 22 can be disposed on one side or many sides of the L-shaped back-plate.

Referring to FIG. 2 again, the backlight module further comprises a first light source 23 and a first radiator 24. The first light source 23 is used to emit red light, the first radiator 24 is connected to the first light source 23.

Figure 3:
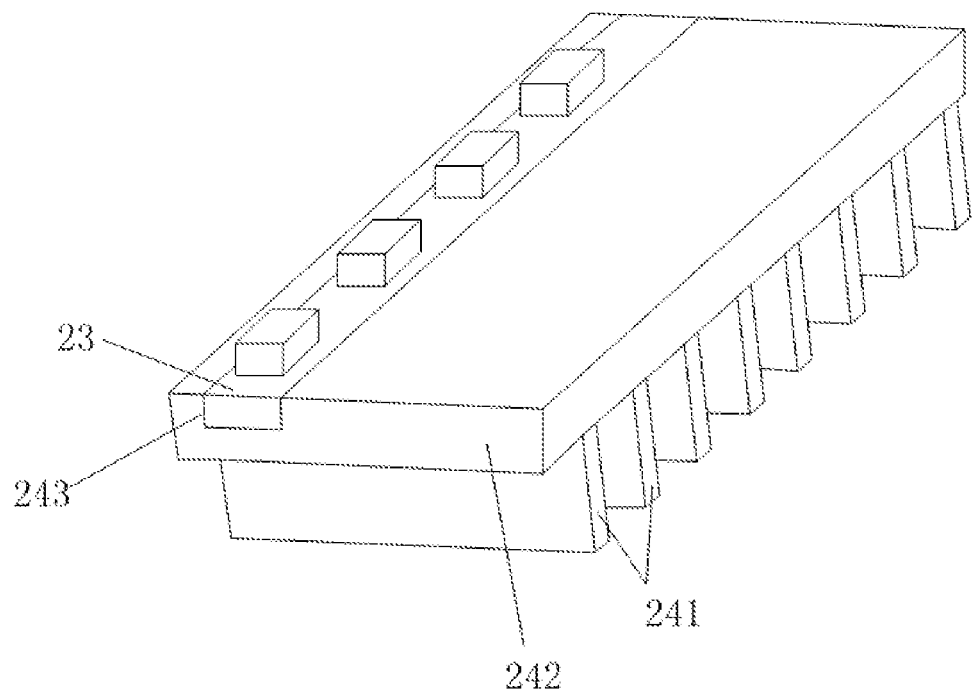
FIG. 3 is an illustration of connection of a first light source and a first radiator of the present invention.

Referring to FIG. 3, it shows the connection of the first light source 23 and the first radiator 24 of the present invention. The first radiator 24 includes a plurality of heat dissipation fins 241 and a heat conduction plate 242. The heat dissipation fins 241 are connected to the heat conduction plate 242. The heat conduction plate 242 has a groove 243, and the first light source 23 is fitted and engaged with the first groove 243.

Referring to FIG. 2, the first back-plate 21 has a through hole 25, the first radiator 24 is disposed on the outer side of the first back-plate 21, the first light source 23 is inserted in the through hole 25 and is extended to the inner side of the first back-plate 21.

Referring to FIG. 2, the backlight module further comprises a second light source 26 used to emit white light, and a second radiator 27. The second light source 26 is disposed on the second back-plate 22, and it is on the inner side of the second back-plate 22. The second radiator 27 is disposed between the second light source 26 and the second back-plate 22.

In this embodiment, both the first light source 23 and the second light source 26 are light emitting diodes (LED), they can also be other light emitting devices which will not be described herein one by one.

Referring to FIG. 2, the first back-plate 21 includes a first back-plate portion 211, a second back-plate portion 212 and a third back-plate portion 213; wherein the first back-plate portion 211 and the third back-plate portion 213 are extended horizontally and they are parallel to each other; and the second back-plate portion 212 is perpendicular to the horizontal and is connected to the first back-plate portion 211 and the third back-plate portion 213, respectively.

Referring to FIG. 2, a second groove 28 is formed at a connection portion between the bent first back-plate 21 and the second back-plate 22, and the through hole 25 is disposed in the second groove 28.

Referring to FIG. 2, the backlight module further comprises a light guide plate 29, the light guide plate 29 is parallel to the horizontal; the first back-plate 21 is disposed under the light guide plate 29; the second back-plate 22 is disposed beside the light guide plate 29. The light guide plate 29 is connected to the third back-plate portion 213 and covers the opening of the second groove 28. The light guide plate 29 is further connected to the second light source 26.

The operating principles of the preferred embodiment of the light emitting devices of the present invention are:

In the light emitting process, the first light source 23 emits red light and the second light source 26 emits white light. Because the first radiator 24 is disposed on the outer side of the first back-plate 21, the second radiator 27 is disposed on the inner side of the second back-plate 22, and the first back-plate 21 is perpendicular to the second back-plate 22, the best heat dissipation effect thus can be achieved by the offsetting arrangement of the first radiator 24 and the second radiator 27, and by the arrangement that the direction of heat dissipation perpendicular to the first back-plate 21 and the direction of heat dissipation perpendicular to the second back-plate 22 do not overlap with each other.

Furthermore, heat produced by the first light source 23 can be dissipated quickly and timely because of the arrangements that the first light source 23 is connected to the first radiator 24, the first radiator 24 includes a plurality of the heat dissipation fins 242, and the first radiator 24 is disposed on the outer side of the first back-plate 21. The problem of the reduced brightness of the red light emitted by the first light source 23 due to increased temperature can be effectively avoided.

The present invention further provides a liquid crystal display (LCD), and the liquid crystal display comprises the backlight module provided by the present invention. The backlight module will not be mentioned again because it has been described in details above.

The present invention has been described with preferred embodiments thereof and it is understood that many changes and modifications to the described embodiments can be carried out without departing from the scope and the spirit of the invention that is intended to be limited only by the appended claims.

What is claimed is:

1. A backlight module, comprising a back-plate, the back-plate being in a L-shape and comprising a first back-plate and a second back-plate;

the backlight module further comprising a first radiator and a first light source used to emit red light, characterized in that:

the first radiator is connected to the first light source; the first back-plate has a through hole, the first radiator is disposed on an outer side of the first back-plate, the first light source is inserted in the through hole and is extended to an inner side of the first back-plate;

the first radiator includes a heat conduction plate and a plurality of heat dissipation fins, the heat dissipation fins are connected to the heat conduction plate;

the backlight module further comprises a second radiator and a second light source used to emit white light, the second light source is disposed on the second back-plate and is on an inner side of the second back-plate, the second radiator is disposed between the second light source and the second back-plate.

2. The backlight module as claimed in claim 1, characterized in that: the heat conduction plate has a first groove, the first groove and the first light source are fitted and engaged with each other.

3. The backlight module as claimed in claim 2, characterized in that: the first back-plate is structurally bent and includes a first back-plate portion, a second back-plate portion and a third back-plate portion, wherein the first back-plate portion and the third back-plate portion are extended horizontally and parallel to each other; the second back-plate portion is perpendicular to the horizontal, and is connected to the first back-plate portion and the third back-plate portion, respectively.

4. The backlight module as claimed in claim 3, characterized in that: a second groove is formed at a connection portion between the bent first back-plate and the second back-plate, and the through hole is disposed in the second groove.

5. The backlight module as claimed in claim 4, characterized in that: the backlight module further comprises a light guide plate, the light guide plate is parallel to the horizontal, the first back-plate is disposed under the light guide plate, the second back-plate is disposed beside the light guide plate, the light guide plate is connected to the third back-plate portion and covers an opening of the second groove, and the light guide plate is further connected to the second light source.

6. A backlight module, comprising a back-plate, the back-plate being in a L-shape and comprising a first back-plate and a second back-plate;

the backlight module further comprising a first radiator and a first light source used to emit red light, characterized in that:

the first radiator is connected to the first light source; and the first back-plate has a through hole, the first radiator is disposed on an outer side of the first back-plate, the first light source is inserted in the through hole and extended to an inner side of the first back-plate, wherein the backlight module further comprises a second radiator and a second light source used to emit white light, the second light source is disposed on the second back-plate and is on the inner side of the second back-plate, and the second radiator is disposed between the second light source and the second back-plate.

7. A backlight module, comprising a back-plate, the back-plate being in a L-shape and comprising a first back-plate and a second back-plate;

the backlight module further comprising a first radiator and a first light source used to emit red light, characterized in that:

the first radiator is connected to the first light source; and the first back-plate has a through hole, the first radiator is disposed on an outer side of the first back-plate, the first light source is inserted in the through hole and extended to an inner side of the first back-plate, wherein the first radiator includes a heat conduction plate and a plurality of heat dissipation fins, and the heat dissipation fins are connected to the heat conduction plate, the heat conduction plate has a first groove, and the first groove and the first light source are fitted and engaged with each other, the first back-plate is structurally bent and includes a first back-plate portion, a second back-plate portion and a third back-plate portion, wherein the first back-plate portion and the third back-plate portion are extended horizontally and parallel to each other; and the second back-plate portion is perpendicular to the horizontal and is connected to the first back-plate portion and the third back-plate portion, respectively, a second groove is formed at a connection portion between the bent first back-plate and the second back-plate, and the through hole is disposed in the second groove.

8. The backlight module as claimed in claim 7, characterized in that: the backlight module further comprises a light guide plate, the light guide plate is parallel to the horizontal, the first back-plate is disposed under the light guide plate, the second back-plate is disposed beside the light guide plate, the light guide plate is connected to the third back-plate portion and covers an opening of the second groove, and the light guide plate is further connected to the second light source.

9. A liquid crystal display, comprising:
a light guide plate, the light guide plate being parallel to the horizontal; and
a backlight module, the backlight module comprising a back-plate, wherein the back-plate is in a L-shape and comprises a first back-plate and a second back-plate, the first back-plate is disposed under the light guide plate, the second back-plate is disposed beside the light guide plate; the backlight module further comprising a first radiator and a first light source used to emit red light, characterized in that:
the first radiator is connected to the first light source; and
the first back-plate has a through hole, the first radiator is disposed on an outer side of the first back-plate, the first light source is inserted in the through hole and is extended to an inner side of the first back-plate, wherein the backlight module further comprises a second radiator and a second light source used to emit white light, the second light source is disposed on the second back-plate and is on the inner side of the second back-plate, and the second radiator is disposed between the second light source and the second back-plate.

10. The liquid crystal display as claimed in claim 9, characterized in that: the heat conduction plate has a first groove, and the first groove and the first light source are fitted and engaged with each other.

\* \* \* \* \*